UNITED STATES PATENT OFFICE.

WASHINGTON BECK AND HENRY FEURHAKE, OF PITTSBURG, PA., ASSIGNORS TO THEMSELVES AND WILLIAM A. O. WUTH, OF SAME PLACE.

IMPROVEMENT IN METHODS OF CLEANING GLASS-MOLDS.

Specification forming part of Letters Patent No. 221,023, dated October 28, 1879; application filed October 2, 1879.

*To all whom it may concern:*

Be it known that we, WASHINGTON BECK and HENRY FEURHAKE, both of the city of Pittsburg, in the county of Allegheny and State of Pennsylvania, have invented a new and useful Improved Method of Cleaning Glass-Molds; and we do hereby declare the following to be a full, clear, and exact description thereof.

Our invention consists of a new and useful method of cleaning glass molds and plungers. These molds and plungers are made of cast-iron, and the molding-face, which is either plain or figured, is finished by polishing with a stone and oil. For this purpose a fine-grained freestone or sandstone is generally used. In some cases the finer grades of emery are used. The finish of the molds and plungers must be very fine and smooth. When in use they are subjected to a continuous alternate heating and cooling by the dropping and pressing of the heated plastic glass therein and the opening of the mold to remove the article.

The effect of the working of the article upon the mold or plunger is the formation on the surface thereof of a black coating of magnetic oxide of iron, which is very hard—so hard, indeed, that when not removed for some time it will turn the edge of a file. This coating is very objectionable, as it gives a greasy and lusterless appearance to the glass. It is therefore removed whenever it is possible; and the operation of removing it which is now in use is slow and expensive, and consists of rubbing the coated surface with a stone dipped in oil, and in some cases with fine emery. This operation, which is repeated daily when a mold is in use, will, in a plain mold of ordinary size, occupy from one to two hours. When, however, it has a pattern in it the operation of cleaning becomes also a very delicate one, the difficulty being increased with the greater intricacy or fineness of the pattern.

Usually the aim of glass-makers is to produce pattern articles as nearly resembling cut-ware as possible, and this resemblance depends on the sharpness and clearness of the lines and the brilliancy of the surface of the glass. In such molds the operation of scouring or rubbing off the coating is generally attended with the obliteration of the sharp lines and the rubbing off of points and edges, this being due, in the first place, to the carelessness of the workman, and in the second to the great difficulty, if not utter impossibility, of making and keeping on the rubbing-stone a suitable point for penetrating and operating in the recesses of the mold.

There are many molds the pattern of which is so intricate or so difficult of access that it is preferred to let them remain coated with the oxide rather than permit them to be touched with a stone at the risk of having them injured. There are other molds which have a peculiar mottled rough surface, designed to produce ware with brilliant crystalline surfaces, that cannot be cleaned at all by the stone, as it would entirely destroy their surface. On the other hand the coating of magnetic oxide, when formed thereon, as it is by one day's use, destroys the peculiar effect of the mottled rough surface on the ware. Such molds would therefore soon become useless.

When a mold is coated with the oxide it heats up more rapidly and retains the heat much longer than a clean mold, the result of which is that the glass sticks to it and works more slowly and difficultly.

In plain glassware brilliance of surface is the desideratum, and this can be obtained only by keeping the molds clean. The rubbing of the stone or emery soon enlarges and makes the mold of such ware out of shape, and rounds off the jointing edges of the mold-sections, thereby causing the production of a fin on the article. In short, this operation of cleaning the molds by scouring is one of the most objectionable things practiced (it has been supposed, necessarily) in connection with the manufacture of molded glassware. Molds do not wear out by use, but by the cleaning.

By our invention the mold is cleaned perfectly of the magnetic oxide and restored to its first finish within a few minutes, without destroying, injuring, or changing its original surface or pattern; and it consists in submitting the molds and plungers which are so coated to the action of diluted acid to destroy or weaken the cohesion of the oxide, then neutralizing the adhering acid, and finally removing the oxide by rubbing or brushing the face of the molds and plungers.

To enable others skilled in the art to use our invention, we will now proceed to describe its use and operation.

We prepare a bath of diluted acid, preferably sulphuric acid, and into this we immerse the mold or plunger to be cleaned. The magnetic oxide of iron is composed of peroxide of iron and protoxide of iron. The acid in the bath immediately attacks the iron of the mold, decomposing the water and producing hydrogen, which acts upon the magnetic oxide, reducing the peroxide to protoxide. The cohesion of the protoxide to the metallic iron of the mold is overcome, so that it can be rubbed or brushed off. As the acid acts on the iron it is desirable that the solution be weak. We prefer to protect the joining and other edges of the mold-sections with an insoluble coating or mastic—say, for instance, balsam of fir or balsam of copaiba. The acid solution may be applied by a brush, if desired.

After the mold or plunger has been in contact with the acid solution for a few minutes, it is washed in clean water and then dipped in an alkaline solution to neutralize the acid remaining on or adhering to it. The protoxide may then be rubbed off with a stiff brush or rough cloth, and the mold or plunger will be clean and bright. The acid solution should not be stronger than is necessary to soften the oxide or break its cohesion, and then the operation of removing it can be completed by vigorous rubbing with the brush or cloth; otherwise the acid solution will prove injurious to the mold or plunger.

The entire operation occupies but a few minutes, and the molds and plungers, whether plain or of the most intricate and delicate pattern, can be cleaned perfectly at very small expense.

The ware produced in molds so cleaned will have brilliance of surface and sharpness of outline, the production of the mold will not be decreased, as is the case with molds which are coated with the oxide, and the mold will last much longer than under the former system of cleaning. Other acids—such as muriatic, acetic, and hydrochloric—may be used.

What we claim as our invention, and desire to secure by Letters Patent, is—

The method of cleaning glass molds and plungers hereinbefore described—that is to say, submitting them to the action of diluted acid, then neutralizing the adhering acid by an alkaline solution, and finally removing the oxide by rubbing or brushing, substantially as described.

In testimony whereof we, the said WASHINGTON BECK and HENRY FEURHAKE, have hereunto set our hands.

WASHINGTON BECK.
HENRY FEURHAKE.

Witnesses:
J. K. SMITH,
T. B. KERR.